US012807786B2

(12) United States Patent
Spilker et al.

(10) Patent No.: US 12,807,786 B2
(45) Date of Patent: Nov. 24, 2026

(54) SILANE COUPLING AGENT CONTAINING A SULFOXIDE FUNCTIONALITY

(71) Applicant: The Goodyear Tire & Rubber Company, Akron, OH (US)

(72) Inventors: Thomas Franklin Spilker, Broadview Heights, OH (US); Frank James Feher, Copley, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 949 days.

(21) Appl. No.: 18/067,758

(22) Filed: Dec. 19, 2022

(65) Prior Publication Data

US 2024/0209185 A1 Jun. 27, 2024

(51) Int. Cl.

*C08K 5/548* (2006.01)
*B60C 1/00* (2006.01)
*C08K 3/04* (2006.01)
*C08K 3/36* (2006.01)

(52) U.S. Cl.

CPC ............ *C08K 5/548* (2013.01); *B60C 1/0016* (2013.01); *C08K 3/04* (2013.01); *C08K 3/36* (2013.01)

(58) Field of Classification Search

CPC ............ C08K 5/548; C08K 3/04; C08K 3/36; B60C 1/0016

See application file for complete search history.

(56) References Cited

U.S. PATENT DOCUMENTS 4,474,908 A 10/1984 Wagner
5,107,009 A * 4/1992 Rauleder ............... C07F 7/1892 556/429
5,780,538 A 7/1998 Cohen et al.
5,827,912 A 10/1998 Scholl
6,005,027 A 12/1999 Guillet et al.
6,121,347 A 9/2000 Yatsuyanagi et al.
6,136,913 A 10/2000 Nahmias et al.
6,573,324 B1 6/2003 Cohen et al.
6,608,145 B1 8/2003 Lin et al.
7,704,552 B2 4/2010 Okel et al.
8,003,724 B2 8/2011 Hahn et al.
8,440,750 B2 5/2013 Hahn et al.
9,074,073 B2 7/2015 Hahn et al.
10,947,369 B2 3/2021 Hahn et al.
11,440,877 B2 9/2022 Kulig et al.
2010/0317778 A1* 12/2010 Gerster .................... C08K 3/36 556/427
2017/0051085 A1 2/2017 Blok et al.
2018/0291124 A1 10/2018 Anderson et al.
2020/0109222 A1 4/2020 Anderson et al.
2022/0204351 A1 6/2022 Hahn et al.

OTHER PUBLICATIONS

Samuel Braverman, "Rearrangements involving sulfenic acids and their derivatives," Chapter 8 in The Chemistry of Sulphenic Acids and their Derivatives, pp. 311-359, Saul Patai, Ed., John Wiley (1990).

J. L. García Ruano, et al., "Product Class 4: Acyclic Dialkyl Sulfoxides and Derivatives," pp. 245-390, in Kambe, N., Science of Synthesis, 39: Category 5, Compounds with One Saturated Carbon Heteroatom Bond (2008).

* cited by examiner

*Primary Examiner* — Joseph S Del Sole
*Assistant Examiner* — Andrea Wu
(74) *Attorney, Agent, or Firm* — Mandy B. Willis

(57) ABSTRACT

A silane coupling agent suited to use in a rubber composition includes first and second coupling units. The first coupling unit including a silicon atom directly linked to a hydrolyzable group, which enables the silane coupling agent to bond to mineral filler particles. The second coupling unit includes a sulfoxide group linked to a leaving group, which enables the silane coupling agent to bond to an alkenyl group of an unsaturated polymer. A linking group connects the silicon atom of the first coupling unit to the sulfoxide group of the second coupling unit, to form a connection between the mineral filler particles and the polymer.

9 Claims, No Drawings

SILANE COUPLING AGENT CONTAINING A SULFOXIDE FUNCTIONALITY

BACKGROUND

The exemplary embodiments described herein relate to a sulfoxide-functionalized silane coupling agent, to methods of forming and using the coupling agent, and to compositions and an article derived therefrom.

Rubber compositions for vehicle tires often contain filler material, such as silica, to improve properties, such as increasing the wear resistance, reducing the rolling resistance, and improving the wet grip.

The surface of the silica particles is hydrophilic, due to the presence of polar hydroxyl groups, while the rubber material in a tire is typically more hydrophobic. This can make it difficult to disperse the silica particles in the rubber mixture during the manufacture of the tire.

To improve dispersion of the silica during dry mixing, it has been proposed that such compounding operations employ a silica which has been treated with an organosilane coupling agent having dual functionality. Representative of such coupling agents include compounds that include both an organic group, such as an amino alkyl group, a mercaptoalkyl group, or a polysulfidic-bis-organo alkoxy silane group bonded directly to a silicon atom along with a readily hydrolyzable group, such as an alkoxy group also bonded directly to the silicon atom. The alkoxy group hydrolyzes in the presence of moisture typically found on the surface of the silica to form the corresponding silanol which reacts with or condenses in the presence of the silica surface to bond the silicon atom to the silica surface. The organic groups attached to the silicon atom are thus available for chemical reaction with the polymer matrix during vulcanization. As a result, the polymer matrix may become chemically bonded by means of the coupling agent to the silica surface during cure or vulcanization of the polymer. International application WO2015153055A1, WO2018191185A1 and U.S. Pub. No. 20200109222A1 are illustrative. Problems associated with the use of such silanes during compounding can include unpleasant odors, premature curing, and/or scorching.

A silane coupling agent is described herein which can avoid or reduce these problems while improving processability of a rubber composition while also yielding improved properties of the vulcanized rubber composition, such as improved tread wear.

BRIEF DESCRIPTION

In accordance with one embodiment, a silane coupling agent includes first and second coupling units. The first coupling unit includes a silicon atom directly linked to a hydrolyzable group. The second coupling unit includes a sulfoxide group linked to a leaving group, A linking group connects the silicon atom of the first coupling unit to the sulfoxide group of the second coupling unit.

In various aspects of this embodiment:

The first coupling unit is capable of being hydrolyzed and, in the hydrolyzed form, to form a covalent bond with a mineral oxide filler.

The second coupling unit is capable of reacting with an unsaturated polymer to form a covalent bond between the coupling agent and the polymer.

The silane coupling agent has the general formula (I):

Formula (I)

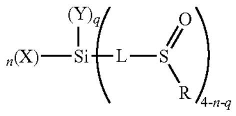

where X represents the hydrolyzable group, Y is selected from a non-hydrolyzable group, a repeat unit corresponding to the rest of Formula (I), and an organosilane group, L represents the linking group, R represents the leaving group, q is 0, 1, or 2, n is 1, 2, or 3, and n+q is less than 4.

The silane coupling agent has the general formula (II):

Formula (II)

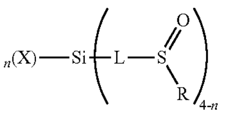

The leaving group R of Formula (I) or (II) has the general formula:

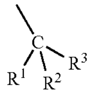

where $R^1$, $R^2$, and $R^3$ are each independently H or a hydrocarbyl group.

At least one of $R^1$, $R^2$, and $R^3$ is each independently an alkyl group.

At least one of $R^1$, $R^2$, and $R^3$ in the Formula above is a methyl group.

Each hydrolysable group X of Formula (I) or (II) is independently selected from an alkoxy group, an acyloxy group, a halogen group, and an amine group.

The linking group L of Formula (I) or (II) is a hydrocarbylene group.

The linking group L of Formula (I) or (II) is selected from $C_2$-$C_{24}$ alkyl groups, $C_2$-$C_{24}$ alkylene groups, $C_4$-$C_{24}$ cycloalkyl groups, $C_4$-$C_{24}$ heterocycloalkyl groups, $C_6$-$C_{24}$ aryl groups, and $C_6$-$C_{24}$ alkylaryl groups.

In accordance with another aspect of this embodiment, a composition includes a product of a reaction of a silane coupling agent as described in any of the aspects above and at least one of a mineral oxide filler and an unsaturated polymer.

In various aspects of the composition:

The composition includes the product of a reaction of the silane coupling agent, the mineral oxide filler, and the unsaturated polymer.

The mineral oxide filler includes silica particles.

The unsaturated polymer includes at least one of polyisoprene; polybutadiene; styrene-butadiene copolymer; and mixtures and copolymers thereof.

The composition further includes at least one of: carbon black, at least one processing aid, and a cure package which includes a vulcanizing agent.

In forming the reaction product, the silane coupling agent is bonded to the least one of the mineral oxide filler and the unsaturated polymer.

A tire includes the composition as described in any of the aspects above.

In accordance with another embodiment, a method of forming a silane coupling agent includes reacting a chlorinated silane compound with a hydrocarbyl thiol, optionally in the presence of a non-oxidizable silane:

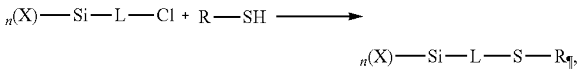

where X represents a hydrolyzable group, L represents a hydrocarbylene linking group, R represents a hydrocarbyl leaving group and n is 1, 2, or 3; and oxidizing the sulfide group to form the silane coupling agent In accordance with another embodiment, a method of forming a polymer composition includes providing a silane coupling agent, the silane coupling agent including a first coupling unit including a silicon atom directly linked to a hydrolyzable group, a second coupling unit including a sulfoxide group linked to a leaving group, and a linking group which connects the silicon atom of the first coupling unit to the sulfoxide group of the second coupling unit. The method further includes hydrolyzing the hydrolyzable group of the first coupling unit to enable the silicon atom to bond to a mineral filler and bonding the sulfoxide group to an alkenyl group of an unsaturated polymer to form a polymer composition in which the mineral filler is bonded to the unsaturated polymer.

In various aspects of this embodiment:

The method further includes heating the polymer composition in the presence of a vulcanizing agent to form a cured rubber composition.

In accordance with another embodiment, a silane coupling agent has the general formula (I):

Formula (I)

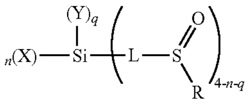

where X represents a hydrolyzable group; Y is selected from a non-hydrolyzable group, a repeat unit corresponding to the rest of Formula (I), and an organosilane group; L represents a hydrocarbylene linking group; R represents a hydrocarbyl leaving group; q is 0, 1, or 2; n is 1, 2, or 3; and n+q is less than 4.

DETAILED DESCRIPTION

A silane coupling agent including a sulfoxide functional group and at least one silicon atom is described. A polymer composition incorporating the silane coupling agent, silane-sulfoxide functionalized polymers silane-sulfoxide functionalized fillers, polymer-filler composites, and methods of forming and using the exemplary silane coupling agent are also described.

The addition of sulfoxide functionality to a silane coupling agent enables filler-polymer interactions to occur without causing significant premature crosslinking between polymer chains (as can be the case with silanes containing unoxidized sulfur groups). Additionally, by using a monopodial silane, such as is the case in various embodiments of the exemplary silane coupling agent, lower viscosities can be achieved in filler-polymer mixtures while maintaining good polymer-filler interactions. Further, the silane coupling agent can provide improved properties of a cured rubber composition.

The silane coupling agent includes a first coupling unit, at a first end, that includes a silicon atom directly linked to a hydrolyzable group and a second coupling unit, at a second end, that includes a sulfoxide group directly linked to a leaving group. The first coupling unit is capable of being hydrolyzed and, in the hydrolyzed form, to form a covalent bond with a mineral oxide filler. The second coupling unit is capable of reacting with an unsaturated polymer (i.e., that includes one or more C═C bonds) to form a covalent bond between the coupling agent and the polymer. The first and second coupling units are linked together by a linking group. In one embodiment, the silane coupling agent has the general formula (I):

Formula (I)

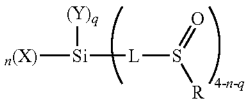

where X represents the hydrolyzable group,

Y is selected from a) a non-hydrolyzable group, b) a repeat unit corresponding to the rest of Formula (I), and c) a hydrolyzable organosilane group different from b), L represents the linking group, e.g., a hydrocarbylene linking group, R represents the leaving group, e.g., a hydrocarbyl leaving group, q is 0, 1, or 2, and n is 1, 2, or 3, and n+q<4.

In one embodiment, q=0 (i.e., Y is absent) and the silane coupling agent has the general formula (II):

Formula (II)

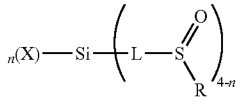

where X represents a hydrolyzable group,

L represents a hydrocarbylene linking group,

R represents a hydrocarbyl leaving group, and n is 1, 2, or 3.

In this embodiment, the silane coupling agent includes no more than one silicon atom, although it may form a condensate with one or more organosilanes during compounding, such as propyltriethoxysilane or octyltriethoxy silane.

In one embodiment, the leaving group R is of the general form:

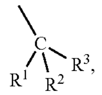

where $R^1$, $R^2$, and $R^3$ are each independently H or a hydrocarbyl group, in particular, at least one, or at least two, or each of $R^1$, $R^2$, and $R^3$ may be a hydrocarbyl group, such as an aliphatic hydrocarbyl group, which can be the same or different.

The silane coupling agent may then have the general formula (III):

Formula (III)

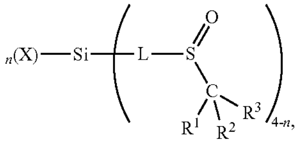

where X, L, and n are as described above.

In one embodiment, n is 3. In another embodiment, n is 1.

As used herein, the term "hydrocarbyl group" is used in its ordinary sense. Specifically, it refers to a group having a carbon atom directly attached to the remainder of the molecule and having predominantly hydrocarbon character. By predominantly hydrocarbon character, it is meant that at least 60%, or at least 70%, or at least 80% of the atoms in the group are selected from hydrogen and carbon. Heteroatoms which may be incorporated in a hydrocarbyl group include sulfur, oxygen, nitrogen, and halogens, and encompass substituents, such as sulfoxide, pyridyl, furyl, thienyl and imidazolyl. In general, no more than two, and in one embodiment, no more than one, non-hydrocarbon substituent will be present for every ten carbon atoms in the hydrocarbyl group. In some embodiments, there are no non-hydrocarbon substituents in the hydrocarbyl group.

Examples of hydrocarbyl groups include:

(i) hydrocarbon groups, that is, aliphatic (e.g., alkyl or alkenyl), alicyclic (e.g., cycloalkyl, cycloalkenyl) groups, aryl groups, and aryl-, aliphatic-, and alicyclic-substituted aryl groups, as well as cyclic groups wherein the ring is completed through another portion of the molecule (e.g., two substituents together form a ring);

(ii) hetero-substituted hydrocarbon groups, that is, groups containing non-hydrocarbon groups (e.g., halo (especially chloro and fluoro), hydroxy, alkoxy, mercapto, alkylmercapto, nitro, nitroso, and sulfoxy), such as heteroaliphatic, heteroalicyclic, heteroaryl, and heteroaryl-, heteroaliphatic-, and heteroalicyclic-substituted aryl groups;

(iii) hetero substituents, that is, substituents which, while having a predominantly hydrocarbon character, may contain other than carbon in a ring or chain otherwise composed of carbon atoms.

Representative aliphatic groups useful as $R^1$, $R^2$, and/or $R^3$ may contain from 1 to 24 carbon atoms, e.g., at least 2 carbon atoms, or at least 3 carbon atoms, or up to 20 carbon atoms, or up to 16 carbon atoms, or up to 10 carbon atoms. Examples of suitable alkyl groups include methyl, ethyl, n-propyl, isopropyl, n-butyl, isobutyl, sec-butyl, n-pentyl, isopentyl, neopentyl, n-hexyl, n-heptyl, n-octyl, iso-octyl, secondary octyl, 2-ethylhexyl, n-nonyl, secondary nonyl, decyl, iso-decyl, undecyl, dodecyl, 2-propylheptyl, tridecyl, isotridecyl, tetradecyl, 4-methyl-2-pentyl, propyl heptyl, hexadecyl, secondary hexadecyl, stearyl, icosyl, docosyl, tetracosyl, 2-butyloctyl, 2-butyldecyl, 2-hexyloctyl, 2-hexyldecyl, 2-octyldecyl, 2-hexyldodecyl, 2-octyldodecyl, and the like.

Representative hetero-substituted aliphatic groups useful as $R^1$, $R^2$, and/or $R^3$ may contain from 1 to 24 carbon atoms, such as polyethylene glycol, polyethylene imine, and the like.

Representative alkenyl groups useful as $R^1$, $R^2$, and/or $R^3$ may contain from 2 to 24 carbon atoms, e.g., at least 3 carbon atoms, or at least 4 carbon atoms, or up to 20 carbon atoms, or up to 16 carbon atoms, or up to 10 carbon atoms. Examples of suitable alkenyl groups include mono- and di-saturated alkenyl groups, such as ethenyl, 2-propenyl, and saturated equivalents of the other alkyl groups exemplified above.

Representative cycloalkyl groups useful as $R^1$, $R^2$, and/or $R^3$ include cyclic versions of alkyl groups that are not aromatic and include monocyclic, bicyclic, and multicyclic cycloalkyl ring systems. Cycloalkyl groups may contain from 3 to 30 carbon atoms. Examples of cycloalkyl groups include cyclopropyl, cyclobutyl, cyclopentyl, cyclohexyl, 1-cyclohexenyl, 3-cyclohexenyl, cycloheptyl, and the like.

A heterocycloalkyl group contains a heteroatom, which can occupy the position at which the heterocycle is attached to the remainder of the molecule. Representative heterocycloalkyl groups useful as $R^1$, $R^2$, and/or $R^3$ include heteroatom-containing versions of cycloalkyl groups that are not aromatic and include monocyclic, bicyclic, and multicyclic heterocycloalkyl ring systems. Heterocycloalkyl groups may contain from 3 to 30 carbon atoms. Examples of heterocycloalkyl include 1-(1,2,5,6-tetrahydropyridyl), 1-piperidinyl, 2-piperidinyl, 3-piperidinyl, 4-morpholinyl, 3-morpholinyl, tetrahydrofuran-2-yl, tetrahydrofuran-3-yl, tetrahydrothien-2-yl, tetrahydrothien-3-yl, and the like.

Representative aryl groups, alkylaryl groups, and cycloalkylaryl groups useful as $R^1$, $R^2$, and/or $R^3$ include phenyl, toluyl, xylyl, cumenyl, mesityl, benzyl, 1,4-diethylbenzyl, phenethyl, styryl, cinnamyl, benzhydryl, trityl, ethylphenyl, propylphenyl, butylphenyl, pentylphenyl, hexylphenyl, heptylphenyl, octylphenyl, nonylphenyl, decylphenyl, undecylphenyl, dodecylphenyl, benzylphenyl, styrenated phenyl, p-cumylphenyl, $\alpha$-naphthyl, $\beta$-naphthyl groups, and mixtures thereof.

Hydrocarbylene groups are the divalent equivalents of hydrocarbyl groups, and may include alkyl hydrocarbylene groups, cycloalkyl hydrocarbylene groups, and heterocyclo hydrocarbylene groups, and other divalent equivalents of the hydrocarbyl groups listed above.

The terminal R group, $-CR^1(R^2)(R^3)$ (or R groups when n is greater than 1), serves as a leaving group, allowing the remainder of the molecule to form a bond with an unsaturated polymer P to form a silane-functionalized polymer FP.

In one embodiment, $R^1$, $R^2$, and $R^3$ are independently an aliphatic hydrocarbyl group, selected from alkyl, alkenyl, and alicyclic groups, as described above for such hydrocarbyl groups. In one specific embodiment, $R^1$, $R^2$, and $R^3$ are each independently an alkyl group. In one embodiment, $R^1$, $R^2$, and $R^3$ are each independently an alkyl group of no more than 16 carbon atoms, or no more than 12 carbon atoms. In one embodiment, at least one of $R^1$, $R^2$, and $R^3$ is no more than five, or no more than three, or only two, or only one carbon atom. In particular, at least one of $R^1$, $R^2$, and $R^3$ may be a methyl group for ease of elimination of a compound of formula $R^1{=}C(R^2)R^3$ from the silane coupling agent. As an illustrative example, $R^1$ is $CH_3$, $R^2$ is $CH_3$, and $R^3$ is $C_9H_{19}$.

The hydrolyzable group X of the silane coupling agent is capable of reacting with water to produce reactive Si—OH groups that can chemisorb on a hydroxylated filler. More particularly, X is a reactive group, which is capable of reacting with an inorganic mineral filler, such as siliceous fillers, e.g., silica or a silicate. During hydrolysis with water present on the surface of the filler particles, a reactive silanol group is formed, which can condense with other silanol groups, for example, those on the surface of siliceous fillers, to form siloxane linkages.

X may be selected from alkoxy, acyloxy, halogen, and amine groups. Where n is more than 1, each X group may be the same or different.

In one embodiment, X is an alkoxy group of the general form $R^4O$—, where $R^4$ is a straight chain or branched $C_1$-$C_{24}$ alkyl group, a $C_2$-$C_{24}$ alkenyl group, or a $C_3$-$C_{30}$ cycloalkyl group, such as those described above for hydrocarbyl groups, or a combination thereof. In one embodiment, X is a $C_1$-$C_5$ alkoxy group, such as an ethoxy group. For example, X may be selected from $CH_3CH_2O$—, $CH_3CH_2CH_2O$—, $(CH_3)_2CHO$—, $CH_3CH_2CH_2CH_2O$—, $(CH_3)_2CHCH_2O$—, and the like.

In another embodiment, X is an acyloxy group of the general form $R^5C(=O)O$—, where $R^5$ is a straight chain or branched $C_1$-$C_{24}$ alkyl group, a $C_2$-$C_{24}$ alkenyl group, or a $C_3$-$C_{30}$ cycloalkyl group, such as those described above for hydrocarbyl groups. For example, X may be selected from $CH_3C(=O)O$—, $CH_3CH_2C(=O)O$, $(CH_3)_2C(=O)O$—, $CH_3CH_2CH_2(=O)O$—, $(CH_3)_2CH(=O)O$—, and the like.

In another embodiment, X is an amine group of the general form $R^6(R^7)(R^8)N$—, where $R^6$, $R^7$, and $R^8$ can be independently selected from H and those groups listed for $R^1$, $R^2$, and $R^3$.

The hydrocarbylene linking group L may be selected from $C_2$-$C_{24}$ hydrocarbylene groups, such as $C_3$ and higher hydrocarbylene groups, as described above, and in particular, from $C_2$-$C_{24}$ alkylene groups, $C_2$-$C_{24}$ alkylenylene groups, $C_4$-$C_{24}$ cycloalkylene groups, $C_3$-$C_{24}$ heterocycloalkylene groups, $C_6$-$C_{24}$ arylene groups and $C_6$-$C_{24}$ alkylarylene groups. In some embodiments, L may include an arylene group that is spaced from each sulfoxide group by at least one carbon atom, or at least two carbon atoms of an alkylene group. In one embodiment, L is a $C_{10}$ or lower, or $C_5$ or lower, or $C_4$ or lower alkylene group or a $C_{12}$ or lower, or $C_8$ or higher alkylarylene group. In one embodiment, L is a $C_3$ or higher alkyl group. Particularly suitable alkyl groups have at least one hydrogen on the β carbon atom, where the β carbon atom is the carbon atom that is directly attached to the carbon atom which is directly attached to the sulfur group. Example L groups of this type include straight chain $C_3$, $C_4$, $C_5$, and $C_6$ hydrocarbylene groups of the form $—(CH_2)_p—$, where p may be from 2-24, and branched hydrocarbylene groups in which there is at least one H on the β carbon atom. Additionally, the α-carbon may be a $CH_2$ group. Examples of suitable L groups include $—CH_2CH_2CH_2—$, $—CH(CH_3)CH_2—$, $—CH_2CH(CH_3)CH_2—$, $—CH_2C(CH_3)_2CH_2CH_2—$, etc., where the ß carbon atom is highlighted in bold. Other example L groups include $—(R^6)CH_2CH_2—$, $—CH_2(R^6)CH_2CH_2—$, $—CH_2CH_2(R^6)CH_2CH_2—$, and the like, where $R^6$ is an arylene group, such as $—C_6H_4—$.

In one embodiment, Y has the general formula (IV):

Formula (IV)

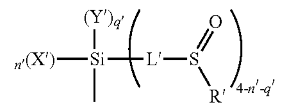

where X', Y', L', R', n', and q' can be selected from the groups and values described for X, Y, L, R, n, and q.

In this embodiment of Formula (I), q is at least 1 and the silane coupling agent includes two or more silicon atoms.

In another embodiment, at least one Y that is present is selected from hydrolysable organosilane groups (which lack a sulfoxide group directly linked to a leaving group), e.g., alkoxysilanes such as propyltriethoxysilane and octyltriethoxy silane.

In another embodiment, at least one Y that is present is selected from non-hydrolysable groups, such as H or hydrocarbyl groups, as described above.

Preparation of the Silane Coupling Agent

Methods of preparing the silane coupling agents include forming a sulfur-containing organosilane and converting the sulfur group to a sulfoxide. For example, a compound of Formula (V):

Formula (V)

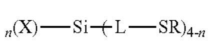

is prepared by reaction of a halogenated silane with a hydrocarbylthiol:

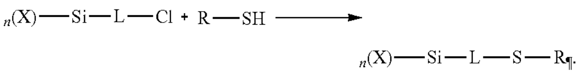

and oxidizing the sulfur group to a sulfoxide group.

In one example embodiment, the compound of Formula V may be prepared by the reaction of a thiol, such as tert-butylthiol with 3-chloropropyltriethoxysilane in a solvent, such as hexane or toluene, followed by oxidation of the sulfide to the sulfoxide.

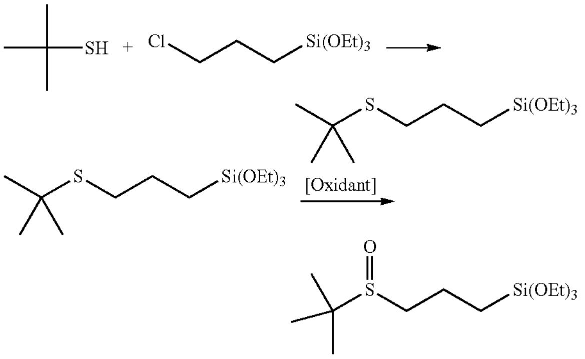

Alternatively, the compound of Formula V may be prepared by the reaction of a hydrocarbyl chloride, such as tert-butyl chloride, with 2-mercaptopropyltriethoxysilane in a solvent, such as hexane or toluene, followed by oxidation of the sulfide to the sulfoxide.

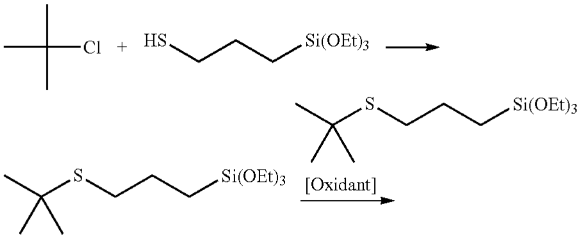

-continued

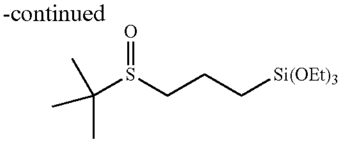

Various methods for preparing sulfoxides from sulfur groups are discussed in J. L. Garcia Ruano, M. B. Cid, A. M. Martin-Castro, and J. Alemán, "Product Class 4: Acyclic Dialkyl Sulfoxides and Derivatives," pp. 245-390, in Kambe, N. Science of Synthesis, 39: Category 5, Compounds with One Saturated Carbon Heteroatom Bond (2008). For example, sulfides can be converted into sulfoxides using hydrogen peroxide in a solvent, such as acetone or acetic acid, optionally in the presence of an organic catalyst, such as 1-Acetyl-1H-[1,2,3]triazolo[4,5-b]pyridine. The oxidation of sulfur groups to sulfoxide can also be performed in the presence of a non-oxidizable, hydrolysable silane, such as propyl triethoxysilane or octyltriethoxysilane. In another method, high pressure oxygen is used.

Reaction of the Silane Coupling Agent with an Unsaturated Polymer

In one embodiment, the silane coupling agent is reacted with an unsaturated polymer P to form a functionalized polymer FP. The reaction may proceed generally as follows (illustrated using the silane coupling agent of Formula (III)):

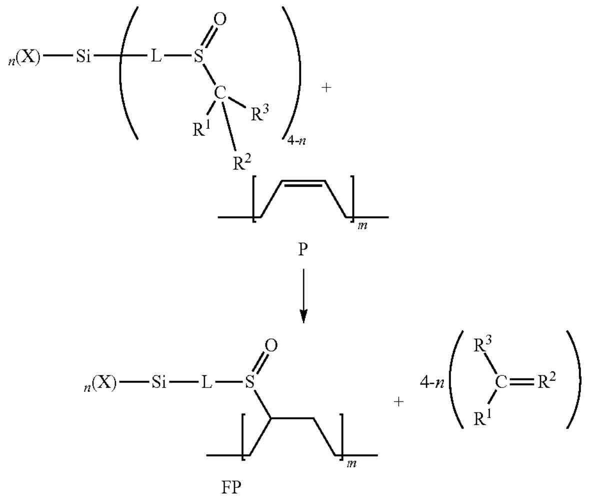

where m may be an integer which is at least 2, or at least 3, such as at least 10, or at least 50, or up to 100,000.

The reaction illustrated may be one which is highly favorable at the reaction temperature (e.g., 110-150 °C), particularly when at least one of $R^1$, $R^2$, and $R^3$ is/are methyl groups. The reaction may be carried out, for example, at about 150°-160 °C for 1-3 minutes. The reaction is exothermic, thus heat need not be supplied once the reaction starts. The reaction may be performed in a suitable mixer, e.g., a mixer suitable for rubber compounding. The mixture can be dropped from the mixer when the temperature reaches 160 °C, or within 1-2 minutes thereafter. If the temperature and/or time is greater, unwanted curing of the polymer can occur since the sulfoxide can act as a vulcanizing agent and thus render the functionalized polymer difficult to process.

It is to be appreciated that the unsaturated polymer P may additionally or alternatively incorporate monomer units other than the butadiene unit illustrated and/or that the silane coupling agent may be coupled to fewer than all the unsaturated groups.

Examples of the other monomer units which may be incorporated in the unsaturated polymer P in addition to, or as an alternative to butadiene, include those derived from isoprene, dimethyl butadiene, styrene, methyl styrene, acrylate monomers, methacrylate monomer, and the like.

The exemplary silane coupling agent containing a sulfoxide functionality is thus able to react with polymers P having olefinic unsaturation. In particular, the silane coupling agent has the ability to react with an unsaturated non-functionalized polymer P during mixing to generate a composite similar to that achieved with a functional polymer.

In some embodiments, the polymer P may include one or more of natural rubber, synthetic polyisoprene, natural polyisoprene, styrene-butadiene copolymer, solution-polymerized styrene-butadiene (SSBR), emulsion-polymerized styrene-butadiene rubber (ESBR), butadiene rubber (BR), halobutyl rubber, bromobutyl rubber, chlorobutyl rubber, nitrile rubber, liquid rubbers, polynorbornene copolymer, isoprene-isobutylene copolymer, ethylene-propylene-diene rubber, chloroprene rubber, acrylate rubber, fluorine rubber, silicone rubber, polysulfide rubber, epichlorohydrin rubber, styrene-isoprene-butadiene terpolymer, hydrated acrylonitrile butadiene rubber, isoprene-butadiene copolymer, butyl rubber, hydrogenated styrene-butadiene rubber, butadiene acrylonitrile rubber, a terpolymer formed from ethylene monomers, propylene monomers, and/or ethylene propylene diene monomer (EPDM), isoprene-based block copolymers, butadiene-based block copolymers, styrenic block copolymers, styrene-butadiene-styrene block copolymer (SBS), styrene-ethylene/butylene-styrene block copolymer (SEBS), styrene-[ethylene-(ethylene/propylene)]-styrene block copolymer (SEEPS), styrene-isoprene-styrene block copolymer (SIS), random styrenic copolymers, hydrogenated styrenic block copolymers, styrene butadiene copolymers, polyisobutylene, ethylene vinyl acetate (EVA) polymers, polyolefins, amorphous polyolefins, semi-crystalline polyolefins, alpha-polyolefins, reactor-ready polyolefins, acrylates, metallocene-catalyzed polyolefin polymers and elastomers, reactor-made thermoplastic polyolefin elastomers, olefin block copolymer, co-polyester block copolymer, polyurethane block copolymer, polyamide block copolymer, thermoplastic polyolefins, thermoplastic vulcanizates, ethylene vinyl acetate copolymer, ethylene n-butyl acrylate copolymer, ethylene methyl acrylate copolymer, neoprene, acrylics, urethane, poly(acrylate), ethylene acrylic acid copolymer, polyether ether ketone, polyamide, atactic polypropylene, polyethylene including atactic polypropylene, ethylene-propylene polymers, propylene-hexene polymers, ethylene-butene polymers, ethylene octene polymers, propylene-butene polymers, propylene-octene polymers, metallocene-catalyzed polypropylene polymers, metallocene-catalyzed polyethylene polymers, ethylene-propylene-butylene terpolymers, copolymers produced from propylene, ethylene, $C_4$-$C_{10}$ alpha-olefin monomers, polypropylene polymers, maleated polyolefins, polyester copolymers, copolyester polymers, ethylene acrylic acid copolymer, and/or polyvinyl acetate, and/or wherein the polymer optionally comprises a modification and/or functionalization selected from one or more of hydroxyl-, ethoxy-, epoxy-, siloxane-, amine-, aminesiloxane-, carboxy-, phthalocyanine-, and silane-sulfide-groups, at the polymer chain ends or pendant positions within the polymer.

The silane-functionalized polymer FP is able to impart improved properties to various rubber compositions, such as those used to form tires, belts, hoses, brakes, rubber gloves, adhesives, sealants, and the like. Automobile tires incorporating the silane-functionalized polymer FP are shown to possess excellent results in balancing the properties of rolling resistance, tire wear, and wet braking performance. A product can be formed with the silane-functionalized polymer without the need for water-absorbing additives that may be harmful in some environments.

In one embodiment, the silane coupling agent or functionalized polymer FP is reacted with an inorganic substrate, in particular, a mineral filler, which may be in particulate form. The functionalized polymer FP or silane coupling agent can be bound to hydroxyl groups on the surface of the substrate, to improve the dispersibility of the filler particles in rubber mixtures. Example mineral fillers include oxides, such as silica, silicate, aluminosilicate; alumina, zirconia, titania, and tin and nickel oxides (referred to generally herein as mineral oxide fillers). In one embodiment, the mineral filler is silica.

Example silica-containing fillers for use in rubber compositions include pyrogenic and precipitated silicas. Such silicas may be characterized by having a CTAB surface area in the range of 40 to 600 m2/g, such as at least 100 m2/g or up to 450 m2/g. The CTAB surface area is measured according to ASTM D6845-20 "Standard Test Method for Silica, Precipitated, Hydrated-CTAB (Cetyltrimethylammonium Bromide) Surface Area." This test method covers the measurement of the specific surface area of precipitated silica, exclusive of area contained in micropores too small to admit hexadecyltrimethylammonium bromide (cetyltrimethylammonium bromide, commonly referred to as CTAB) molecules. The silica particles may have an average particle size (mean diameter) of 0.01 to 0.05 micron as determined by an electron microscope, although the silica particles may be even smaller, or larger, in size.

Various commercially available silicas may be used, such as silicas commercially available from PPG Industries under the Hi-Sil trademark with designations 210 and 243; silicas available from Rhodia, with, for example, designations of Z1165MP and Z165GR, silicas available from Degussa AG with, for example, designations VN2 and VN3, and silicas from Solvay, e.g., sold as Zeosil™ Premium SW and Premium 200 MP.

The silica particles may be functionalized, e.g., with thiol groups, and/or have been pretreated with an organosilane, other than the sulfoxide containing silane coupling agent described herein. The organosilane is generally one which increases the hydrophobic character of the silica particles. Examples of organosilanes include alkylsilanes, which may be halogenated, alkoxylated, and/or contain polysulfide groups. Specific example include bis-(3-trimethoxysilylpropyl)-disulfide and bis-(3-trimethoxysilylpropyl)-tetrasulfide. Other example organosilanes suitable for pretreatment of silica particles are described, for example, in U.S. Pat. Nos. 4,474,908A, 5,780,538A, 6,573,324B1, 7,704,552B2, 8,003,724B2, 9,074,073B2, and 11,440,877B2, and U.S. Pub. No. 20220204351A1.

Silica is a widely-used filler material for rubber mixtures. In particular, silica is often included in rubber mixtures for vehicle tires. However, the surface of silica particles is hydrophilic due to the presence of polar hydroxyl groups, whereas the rubber material in a tire is typically more hydrophobic, which can make it difficult to disperse the silica particles in the rubber mixture during the manufacture of the tire. The present silane coupling agent both improves the dispersion of the silica particles in the polymer P or FP while also coupling the polymer to the particles. The silane coupling agent facilitates adding high loadings of silica into a rubber composition, which generally leads to increased wet traction when the rubber composition is used to form a tire tread for a tire.

Reaction of the Silane Coupling Agent with an Inorganic Oxide

The product of reacting the silane coupling agent with the inorganic oxide ranges from bonding with the inorganic oxide, altering the wetting or adhesion characteristics of the inorganic oxide, utilizing the inorganic oxide to catalyze chemical transformations at the heterogeneous interface, ordering the interfacial region, and modifying its partition characteristics. Significantly, it includes the ability to effect a covalent bond between the silane coupling agent and the inorganic oxide, e.g., when the inorganic oxide includes a silicate or an aluminosilicate. Stable condensation products are also formed with other oxides, such as those of aluminum, zirconium, tin, titanium, and nickel. Less stable bonds are formed with oxides of boron, iron, and carbon. However, alkali metal oxides and carbonates typically do not form stable bonds with Si—O—.

In one embodiment, the alkoxy group(s) (or other hydrolyzable groups X) of the silane coupling agent are hydrolyzed to form silanol-containing species that can react with the inorganic oxide surface. In one embodiment, hydrolysis of the alkoxy groups occurs in the presence of water. The OH groups of the hydrolyzed silane coupling agent then hydrogen bond with OH groups of the inorganic oxide surface. Finally, during drying or curing, a covalent linkage is formed with the inorganic oxide surface with concomitant loss of water. Although described sequentially, these reactions can occur simultaneously after the initial hydrolysis step. At the interface, there is often only one (or sometimes two) bond from each silicon of the silane coupling agent to the substrate surface. Any remaining silanol groups on the coupling agent are present either in condensed or free form. The R group remains available for covalent reaction or physical interaction with the polymer P (or may have been previously reacted with the polymer P). The coupled silane coupling agent can modify the inorganic oxide surface by forming a monolayer (or multi-layer) coating that resists clumping of the particles.

The reaction of the silane coupling agent with the silica particles (or other inorganic oxide substrate) may take place at elevated temperatures (e.g., 50 °C-170 °C, such as 150 °C-160 °C) may be employed for coupling of the silane coupling agent with the particles. In some embodiments, a catalyst may be employed. Water for the hydrolysis of the silane coupling agent may come from several sources. It may be added, it may be present on the inorganic oxide surface, or it may come from the atmosphere. The degree of polymerization of the silane in the silane coupling agent depends on the amount of water available and the organic substituent. If considerable water is present and the silane coupling agent has low solubility, a high degree of polymerization is favored. Although a monolayer is generally desired, multilayer adsorption may result. The formation of covalent bonds to the surface may proceed with a certain amount of reversibility. The temperature may be raised to the selected temperature and held at the temperature for 1-10 minutes, e.g., up to 2 minutes. As water is removed, during the temperature ramp up or by evacuation for 2 to 6 hours, bonds may form, break, and reform to relieve internal stress. The same mechanism can permit a positional displacement of interface components.

In one embodiment, the silane coupling agent has three alkoxy groups. Such a material tends to deposit as a polymeric film, effecting total coverage and maximizing the introduction of organic functionality. They are particularly suited to forming rubber composites, adhesives, sealants, and coatings.

In the case of a silicate-containing substrate, for example, the coupling reaction may proceed generally as follows to form a reaction product comprising a polymer-filler composite PFC with an —Si-L-S(═O)— linkage:

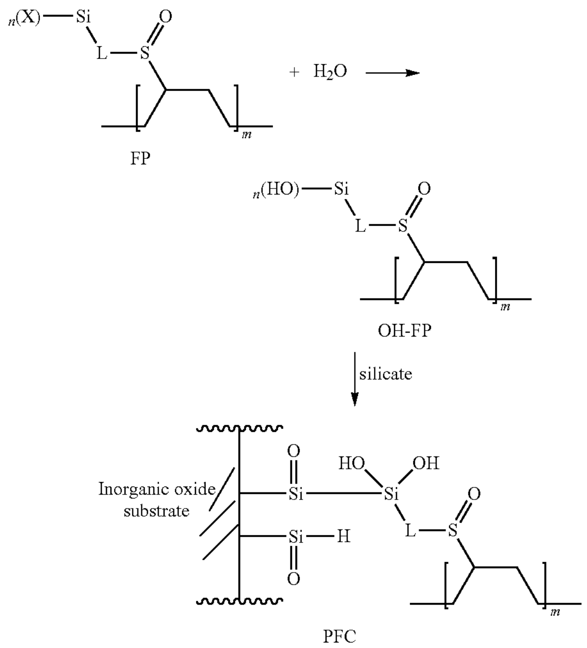

FP

OH-FP

PFC

In this example, the water for hydrolyzing the coupling agent may come from the silica substrate surface.

As will be appreciated, coupling of the silane coupling agent with the polymer P may occur prior to, during, or after coupling of the silane coupling agent to the inorganic substrate. In one method, a portion of the silane coupling agent may be added to a mineral filler to improve dispersion in the polymer P or FP, with the remainder added to the polymer.

For example, formation of a silanized mineral filler FS may proceed as follows:

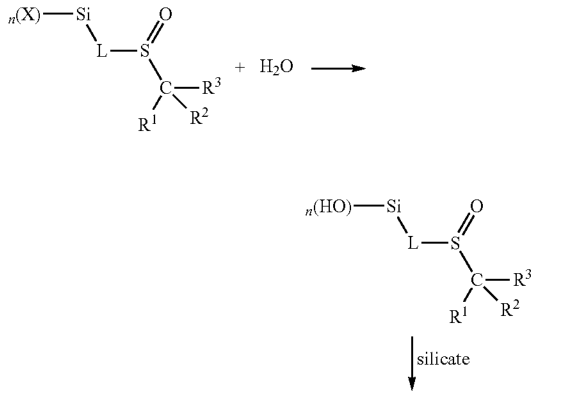

-continued

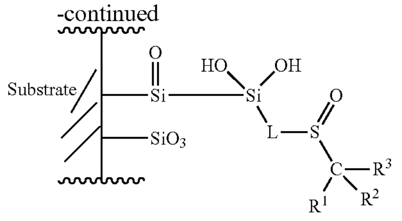

FS when the substrate includes silica.

One illustrative example of the silane coupling agent has the structure:

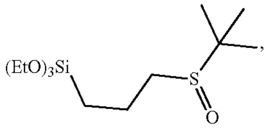

(triethoxy, propyl-sulfoxy-tert-butyl silane)

which reacts with an unsaturated polymer, as illustrated above, in the presence of heat to form a less unsaturated polymer, e.g., a saturated polymer. The reaction with the unsaturated polymer P can be represented as follows:

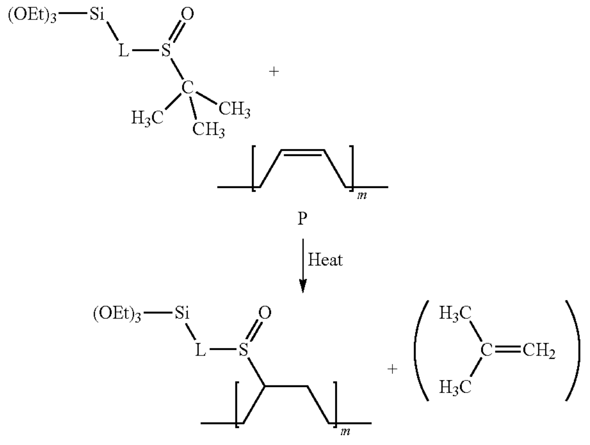

P

As used herein, the term "phr" means parts per one hundred parts rubber, where the term "rubber" encompasses the exemplary polymer described herein, in either its uncured or cured (vulcanized) state. In general, using this convention, a rubber composition comprises 100 parts by weight of rubber. The claimed composition may comprise other polymers than explicitly mentioned in the claims, provided that the phr value of the total is 100. The term "phf" refers to parts per one hundred parts of mineral oxide filler, by weight.

The silica particles (or other mineral oxide filler) may be combined with the polymer P or functionalized polymer FP in amounts ranging from 4 phr to 250 phr, or at least 15 phr or up to 150 phr. In various embodiments, a polymer (rubber) composition includes:

100 phr of an unsaturated polymer P, at least 4 phr or at least 6 phr, or at least 20 phr, or at least 30 phr, or up to 160 phr, or up to 80 phr of a mineral oxide filler, and at least 0.05 phf, or at least 0.1 phf, or up to 16 phf, or up to 12 phf, or up to 10 phf of a silane coupling agent which includes a sulfoxide functional group and at least one silicon atom, wherein the silane coupling agent is optionally coupled to at least one of the mineral filler and the polymer P to form at least one of a silanized mineral filler FS, a functionalized polymer FP, and a polymer-filler composite PFC.

When the polymer composition includes other organosilanes, such as those described above for pretreatment of the filler, or added to the polymer composition subsequently, a total of the silane coupling agent and other organosilanes may be at least 4 phf, or at least 6 phf, or up to 16 phf, or up to 12 phf. For example, the silane coupling agent may be at least 0.1 wt. %, or at least 1 wt. %, or up to 5 wt. % of the total of organosilanes used in the polymer composition. The organosilanes are generally present in a sufficient amount to coat the silica particles to provide good dispersion in the polymer composition. While the exemplary silane coupling agent serves this function, only a minor amount is needed to perform the function of coupling the silica particles to the polymer. Thus, the majority of the organosilanes present can be organosilanes other than the exemplary silane coupling agent.

Examples of other organosilanes useful herein include alkyl silanes, alkoxy silanes, and allyl silanes, as described, for example, in U.S. Pat. Nos. 5,827,912, 5,780,535, 6,005,027, 6,136,913, 6,121,347, 6,608,145B1, 8,003,724B2, 8,440,750B2, and 10,947,369B2. Such organosilanes may include a sequence of from one to eight sulfur atoms, the sequence being connected at each end to a carbon atom.

In one embodiment, the polymer composition is a rubber forming composition which further includes one or more of: a reinforcing filler, other than the mineral oxide filler, one or more processing aids, such as oils and waxes, antioxidants and/or antidegradants, and a cure package including a cure agent and one or more cure accelerators/activators. Examples of these components are as follows:

Other Reinforcing Fillers

Reinforcing fillers, in a total amount of at least 1 phr, or up to 200 phr, may include one or more of carbon black, alumina, aluminum hydroxide, clay (reinforcing grades), magnesium hydroxide, boron nitride, aluminum nitride, titanium dioxide, reinforcing zinc oxide.

The amount of carbon black, where used, may range from 5 phr to 200 phr, such as at least 10 phr or up to 80 phr, or up to 50 phr. It is to be appreciated that the silane coupling agent may be used in conjunction with a carbon black, namely pre-mixed with a carbon black prior to addition to a rubber composition. In one embodiment, the total amount of silica and carbon black is at least about 30 phr, such as at least 45 phr or up to 130 phr. A ratio of carbon black to silica in the composition may range from 1:100 to 100:1, by weight, such as at least 10:90, or at least 20:80, or up to 90:10, or up to 80:20.

The carbon black may have a CTAB specific surface area of at least 100, or at least 102, or at least 104, or up to 120, or up to 118, or up to 116 m2/kg. Exemplary carbon blacks useful herein include ASTM designations N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991, as specified by ASTM D1765-21, "Standard Classification System for Carbon Blacks Used in Rubber Products." These carbon blacks may have iodine absorptions ranging from 9 to 145 g/kg and a DBP number ranging from 34 to 150 $cm^3/100$ g.

Processing Aids

Processing aids may be used at a total of at least 4 phr, or up to 100 phr, and may include one or more of liquid plasticizers, resins, waxes, antioxidants, antidegradants, antiozonants, and materials which provide two or more of these functionalities.

The term liquid plasticizer is used to refer to plasticizer ingredients which are liquid at room temperature (i.e., liquid at 25 °C and above). Hydrocarbon resins, in contrast to plasticizers, are generally solid at room temperature. Generally, liquid plasticizers have a Tg that is below 0 °C, generally well below 0 °C, such as less than −30 °C, or less than −40 °C, or less than −50 °C, such as a Tg of 0 °C to −100 °C.

Suitable liquid plasticizers include oils (e.g., petroleum-based hydrocarbon oils as well as plant-sourced oils) and non-oil liquid plasticizers, such as ether plasticizers, ester plasticizers, phosphate plasticizers, and sulfonate plasticizers. Liquid plasticizer may be added during the compounding process or later, as an extender oil (which is used to extend a rubber). Petroleum based oils may include aromatic, naphthenic, low polycyclic aromatic (PCA) oils, and mixtures thereof. Plant oils may include oils harvested from vegetables, nuts, seeds, and mixtures thereof, such as triglycerides.

Suitable low PCA oils include those having a polycyclic aromatic content of less than 3 wt. % by weight as determined by the IP346 method (Standard Methods for Analysis & Testing of Petroleum and Related Products and British Standard 2000 Parts, 2003, 62nd edition, published by the Institute of Petroleum, UK). Exemplary petroleum sourced low PCA oils include mild extraction solvates (MES), treated distillate aromatic extracts (TDAE), TRAE, and heavy naphthenics. Exemplary MES oils are available commercially as CATENEX™ SNR from Shell, PROREX™ 15 and FLEXON™ 843 from ExxonMobil, and VIVATEC™ 200 from H&R Group. Exemplary TDAE oils are available as TYREX™ 20 from ExxonMobil, and VIVATEC™ 500 and VIVATEC™ 180 from H&R Group. Exemplary heavy naphthenic oils are available as SHELLFLEX™ 794 from Shell, and Hyprene™ Black Oil from Ergon. Exemplary plant-sourced oils include soy or soybean oil, sunflower oil (including high oleic sunflower oil), safflower oil, corn oil, linseed oil, cotton seed oil, rapeseed oil, cashew oil, sesame oil, camellia oil, jojoba oil, macadamia nut oil, coconut oil, and palm oil.

Exemplary ether plasticizers include polyethylene glycols, polypropylene glycols, and polybutylene glycols, including triesters and diesters of carboxylic acid, phosphoric acid, or sulphonic acid, and mixtures of these triesters. More specifically, exemplary carboxylic acid ester plasticizers include compounds selected from the group consisting of trimellitates, pyromellitates, phthalates, 1,2-cyclohexanedicarboxylates, adipates, azelates, sebacates, glycerol triesters, and mixtures thereof. Exemplary glycerol triesters include those which include at least 50 wt. % by weight, or at least 80 wt. % of an unsaturated C18 fatty acid (e.g., oleic acid, linoleic acid, linolenic acid, and mixtures thereof). Other exemplary carboxylic acid ester plasticizers include stearic acid esters, ricinoleic acid esters, phthalic acid esters (e.g., di-2-ethylhexyl phthalate and diisodecyl phthalate), isophthalic acid esters, tetrahydrophthalic acid esters, adipic acid esters (e.g., di(2-ethylhexyl)adipate and diisooctyl adipate), malic acid esters, sebacic acid esters (e.g., di(2-ethylhexyl)sebacate and diisooctyl sebacate), and fumaric acid esters. Exemplary phosphate plasticizers include those with a tri-hydrocarbyl phosphate or di-hydrocarbyl phosphate structure (where each hydrocarbyl is independently selected from $C_1$ to $C_{12}$ alkyl groups and substituted and un-substituted $C_6$ to $C_{12}$ aromatic groups. More specifically, exemplary phosphate plasticizers include trimethyl phosphate, triethyl phosphate, tributyl phosphate, trioctyl phosphate, dioctyl phosphate, 2-ethylhexyl diphenyl phosphate, tributoxyethyl phosphate, triphenyl phosphate, cresyl diphenyl phosphate, isodecyl diphenyl phosphate, tricresyl phosphate, tritolyl phosphate, trixylenyl phosphate, tris(chloroethyl)phosphate, and diphenyl mono-o-xenyl phosphate. Exemplary sulfonate plasticizers include sulfonic acid esters, such as sulfone butylamide, toluenesulfonamide, N-ethyl-toluenesulfonamide, and N-cyclohexyl-p-toluenesulfonamide.

The Tg of the oil or oils used may be −40 °C to −100 °C.

The rubber composition may include at least 5 phr, or up to 70 phr of liquid plasticizer, or up to 40 phr of liquid plasticizer. In other embodiments, liquid plasticizers are absent from the rubber composition.

Suitable resins include hydrocarbon resins. Example hydrocarbon resins include aromatic, aliphatic, and cycloaliphatic resins, including terpenes and terpenoids. The hydrocarbon resin may have a Tg of at least 0 °C, or at least 30 °C, or up to 125 °C, or up to 50 °C. Hydrocarbon resin Tg can be determined by DSC, according to the procedure discussed above for elastomer Tg measurements. The hydrocarbon resin may have a softening point of at least 70 °C, or up to 100 °C. The softening point of a hydrocarbon resin is generally related to the Tg. The Tg is generally lower than its softening point, and the lower the Tg the lower the softening point.

In one embodiment, the hydrocarbon resin, where used, is present in the rubber composition in a total amount of at least 1 phr, at least 2 phr, at least 3 phr, or at least 5 phr, or up to 70 phr, or up to 50 phr, or up to 40 phr, or up to 30 phr, or up to 20 phr, or up to 10 phr. In other embodiments, hydrocarbon resins are absent from the rubber composition.

Examples of aliphatic resins include C5 fraction homopolymer and copolymer resins. Examples of cycloaliphatic resins include cyclopentadiene ("CPD") homopolymer or copolymer resins, dicyclopentadiene ("DCPD") homopolymer or copolymer resins, and combinations thereof.

Examples of aromatic resins include aromatic homopolymer resins and aromatic copolymer resins. An aromatic copolymer resin refers to a hydrocarbon resin which comprises a combination of one or more aromatic monomers in combination with one or more other (non-aromatic) monomers, with the majority by weight of all monomers generally being aromatic.

Specific examples of aromatic resins include coumarone-indene resins, alkyl-phenol resins, and vinyl aromatic homopolymer or copolymer resins. Examples of alkyl-phenol resins include alkylphenol-acetylene resins such as p-tert-butylphenol-acetylene resins, alkylphenol-formaldehyde resins (such as those having a low degree of polymerization). Vinyl aromatic resins may include one or more of the following monomers: alpha-methylstyrene, styrene, ortho-methylstyrene, meta-methylstyrene, para-methylstyrene, vinyltoluene, para(tert-butyl)styrene, methoxystyrene, chlorostyrene, hydroxystyrene, vinylmesitylene, divinylbenzene, vinylnaphthalene and the like. Examples of vinylaromatic copolymer resins include vinylaromatic/terpene copolymer resins (e.g., limonene/styrene copolymer resins), vinylaromatic/C5 fraction resins (e.g., C5 fraction/styrene copolymer resin), vinylaromatic/aliphatic copolymer resins (e.g., CPD/styrene copolymer resin, and DCPD/styrene copolymer resin).

Other aromatic resins include terpene resins, such as alpha-pinene resins, beta-pinene resins, limonene resins (e.g., L-limonene, D-limonene, dipentene which is a racemic mixture of L- and D-isomers), beta-phellandrene, delta-3-carene, delta-2-carene, and combinations thereof.

In one embodiment, the hydrocarbon resin includes a combination of aromatic and aliphatic/cycloaliphatic hydrocarbons. In such cases, the total amount of any aliphatic and/or cycloaliphatic resin used in combination with the aromatic resin may be no more than 5 phr, or less than 4 phr, or less than 3 phr, or more than 20% by weight, or no more than 15% or no more than 10% by weight of the overall amount of hydrocarbon resins.

The aromatic resin may have a Mw of at least 1000 grams/mole and/or up to 4000 grams/mole.

Other example resins which may be used in the rubber composition include tackifying resins, such as unreactive phenol formaldehyde, and stiffness resins, such as reactive phenol formaldehyde resins and resorcinol or resorcinol and hexamethylene tetramine, which may be used at 1 to 10 phr, with a minimum tackifier resin, if used, being 1 phr and a minimum stiffener resin, if used, being 3 phr. Other resins include benzoxazine resins, as described in U.S. Pub. No. 20220195153 to Papakonstantopoulos, et al.

A total amount of resin in the rubber composition may be at least 1 phr, or at least 5 phr, or up to 50 phr, or up to 20 phr, or up to 10 phr. In other embodiments, resins are absent from the rubber composition.

Suitable waxes, particularly microcrystalline waxes, may be of the type shown in The Vanderbilt Rubber Handbook (1978), pp. 346 and 347. Example waxes include C22-C60 saturated hydrocarbons, which may be branched or unbranched, and mixtures thereof. The wax(es), where used, may be present in the rubber composition at 1 to 5 phr. In other embodiments, waxes are absent from the rubber composition.

The waxes used may serve as antiozonants.

Exemplary antioxidants include amine based antioxidants, such as paraphenylenediamines (PPDs), e.g., diphenyl-p-phenylenediamine, N-(1,3-dimethylbutyl)-N'-phenyl-p-phenylenediamine (6PPD), diphenyl-p-phenylenediamine, and others, such as those disclosed in The Vanderbilt Rubber Handbook (1978), pages 344-346. Such antioxidants may also serve as antiozonants and may be used at from 0.1 to 5 phr, such as at least 0.3 phr, or at least 1 phr, or up to 3 phr. In other embodiments, antioxidants, such as paraphenylenediamines, are absent from the rubber composition.

Antidegradants, where used, may include amine based antidegradants and phenol-containing antidegradants, and may be used at from 1 to 5 phr. In other embodiments, antidegradants are absent from the rubber composition.

Phenol-containing antidegradants include polymeric hindered phenol antioxidants, and others, such as those included in The Vanderbilt Rubber Handbook (1978), pages 344-347.

Cure Package

The cure package includes a vulcanizing (curing) agent and at least one of: a vulcanizing accelerator, a vulcanizing activator (e.g., zinc oxide, fatty acids, such as stearic acid, and the like), a free radical initiator, a vulcanizing inhibitor, and an anti-scorching agent.

The vulcanization of the rubber composition is conducted in the presence of a vulcanizing agent, such as a sulfur-based vulcanizing agent and/or a peroxide-based vulcanizing agent.

Examples of suitable sulfur vulcanizing agents include elemental sulfur (free sulfur), insoluble polymeric sulfur, soluble sulfur, and sulfur donating vulcanizing agents, for example, an amine disulfide, polymeric polysulfide, or sulfur olefin adduct, and mixtures thereof.

Sulfur vulcanizing agents may be used in an amount of from 0.1 to 10 phr, such as at least 0.5 phr, or at least 1 phr, or up to 8 phr, or up to 5 phr. In other embodiments, sulfur vulcanizing agents are absent from the rubber composition.

Cure accelerators and activators act as catalysts for the vulcanization agent. Accelerators are used to control the time and/or temperature required for vulcanization and to improve the properties of the vulcanizate. In one embodiment, a single accelerator system may be used, i.e., primary accelerator. A primary accelerator may be used in amounts ranging from 0.5 to 3 phr. In another embodiment, combinations of two or more accelerators may be used. In this embodiment, a primary accelerator is generally used in the larger amount (0.5 to 2 phr), and a secondary accelerator is generally used in smaller amounts (0.05 to 0.50 phr), in order to activate and to improve the properties of the vulcanizate. Combinations of such accelerators have historically been known to produce a synergistic effect of the final properties of sulfur-cured rubbers and are often somewhat better than those produced by use of either accelerator alone. In addition, delayed action accelerators may be used which are less affected by normal processing temperatures but produce satisfactory cures at ordinary vulcanization temperatures.

Representative examples of cure accelerators include amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound, although a second sulfenamide accelerator may be used.

Examples of such cure accelerators include thiazole and/or sulfenamide vulcanization accelerators, such as 2-mercaptobenzothiazole, 2,2'-dithiobis(benzothiazole) (MBTS), N-cyclohexyl-2-benzothiazole-sulfenamide (CBS), and N-tert-butyl-2-benzothiazole-sulfenamide (TBBS), guanidine vulcanization accelerators, such as diphenyl guanidine (DPG), and mixtures thereof. In tread compositions, thiuram accelerators may be omitted.

The amount of the vulcanization accelerator may be from 0.1 to 10 phr, e.g., at least 0.5 phr, or at least 1 phr, or up to 5 phr. In other embodiments, vulcanization accelerators are absent from the rubber composition.

Vulcanizing activators are additives used to support vulcanization. Generally, vulcanizing activators include both an inorganic and organic component. Zinc oxide is the most widely used inorganic vulcanization activator. Organic vulcanization activators include stearic acid, palmitic acid, lauric acid, zinc salts of each of the foregoing, and thiourea compounds, e.g., thiourea, and dihydrocarbylthioureas such as dialkylthioureas and diarylthioureas, and mixtures thereof. Specific thiourea compounds include N, N'-diphenylthiourea, trimethylthiourea, N,N'-diethylthiourea (DEU), N,N'-dimethylthiourea, N,N'-dibutylthiourea, ethylenethiourea, N,N'-diisopropylthiourea, N, N'-dicyclohexylthiourea, 1,3-di(o-tolyl)thiourea, 1,3-di(p-tolyl)thiourea, 1,1-diphenyl-2-thiourea, 2,5-dithiobiurea, guanylthiourea, 1-(1-naphthyl)-2-thiourea, 1-phenyl-2-thiourea, p-tolylthiourea, and o-tolylthiourea.

The amount of inorganic vulcanization activator may be from 0.1 to 6 phr, or at least 0.5 phr, or at least 1 phr, or up to 4 phr. The amount of organic vulcanization activator may be from 0.1 to 10 phr, or at least 0.5 phr, or at least 1 phr, or at least 4 phr, or up to 8 phr. In other embodiments, one or both of inorganic and organic vulcanization activators are absent from the rubber composition.

Free radical initiators, which may be used in some embodiments, are sometimes known as redox initiators, and include combinations of chelated iron salts, sodium formaldehyde sulfoxylate, and organic hydroperoxides. Representative organic hydroperoxides include cumene hydroperoxide, paramenthane hydroperoxide, and tertiary butyl hydroperoxide. The free radical initiator may be used in combination with, or as an alternative to, a sulfur-based vulcanizing agent. The amount of free radical initiator, where used, may be 0.1 to 4 phr, or 0.5 to 2 phr. In other embodiments, free radical initiators are absent from the rubber composition.

Vulcanization inhibitors are used to control the vulcanization process and generally retard or inhibit vulcanization until the desired time and/or temperature is reached. Example vulcanization inhibitors include cyclohexylthiophthalimide.

The amount of vulcanization inhibitor, where used, may be 0.1 to 3 phr, or 0.5 to 2 phr. In other embodiments, vulcanization inhibitors are absent from the rubber composition.

Example Rubber compositions are shown in Table 1.

TABLE 1

Example Rubber Compositions

| Component | Example A | Example B |
|---|---|---|
| Unsaturated polymer | 100 phr | 100 phr |
| Silica | 4-250 phr | 10-150 phr |
| Silanes (total of a) and b)) | 4-16 phf | 6-12 phf |
| a) Exemplary silane coupling agent | 0.05-12 phf | 0.1-10 phf |
| b) Other silanes (optional) | Balance of 4-16 phf | Balance of 6-12 phf |
| Carbon black | 2-200 phr | 5-80 phr |
| Processing aids (liquid plasticizer, resin, wax, anti-oxidants, antidegradants, antiozonants) | 4-100 phr | 10-50 phr |
| Cure Package (sulfur vulcanizing agent, cure accelerator, cure activator, zinc oxide) | 1-30 phr | 5-20 phr |

Forming a Rubber Composition

To form a cured rubber composition, one or more non-productive mixing stages is/are followed by a productive mixing stage, and finally a vulcanization stage, in which the rubber composition is cured, e.g., to form a shaped product, such as a tire tread.

The non-productive stages are intended to mix the polymer(s) and other rubber forming additives (as exemplified above, but excluding at least the vulcanizing agent and accelerator(s)), particularly the reinforcing filler(s), to blend them thoroughly. The non-productive stages may be performed at a suitable temperature of 140-200 °C, with the mixture being allowed to cool between each of the non-productive stages. The number of non-productive stages may depend on the amount of filler(s) to be incorporated, with higher filler amounts generally involving a greater number of non-productive stages, e.g., up to three, or in some cases, four or more.

In the productive mixing step, i.e., when the vulcanization agent is added, the temperature is generally maintained at a temperature below that at which curing occurs to any substantial degree, e.g., no more than 120 °C, such as 40 °C to 120 °C, or 60 °C to 110 °C. The rubber composition may then be cured at a temperature at which vulcanization occurs, e.g., at temperatures ranging from 100 °C to 200 °C, or from 110 °C to 180 °C. Any of the usual vulcanization processes may be used, such as heating in a press or mold, or heating with superheated steam or hot air. For example, tires can be built, shaped, molded and cured by various methods which are known and will be readily apparent to those having skill in such art.

The exemplary silane coupling agent can be incorporated before the first non-productive mixing stage, during one or more of the non-productive mixing stage, during the productive mixing stage, during the vulcanization stage, or in more than one of these stages. In one embodiment, the silane coupling agent may be combined separately with the mineral filler and/or unsaturated polymer prior to being mixed with other rubber forming additives. In another embodiment, the silane coupling agent is added to the mixer with the filler, unsaturated polymer, and one or more rubber forming additives in one or more of the non-productive mixing stages. In another embodiment, the silane coupling agent is added to the mixer after the non-productive mixing stage(s), such as in the productive mixing stage. In some embodiments, one or more other silanes, such as an alkoxysilane which lacks a sulfoxide group, may also be incorporated in the non-productive mix, and/or the productive mix, and/or combined with the mineral filler prior to the nonproductive mixing stage(s).

Zinc oxide may react with the sulfoxide group of the silane coupling agent, to form zinc sulfide or zinc thiolate, which are inert and can also affect the viscosity of the batch. Accordingly, it is generally desirable to add the zinc activator after the non-productive stages are complete. Additionally, since the silane coupling agent can act as a curing agent, the temperature of the mix once the silane coupling agent has been added may be maintained at or below 160 °C to minimize premature vulcanization.

Without intending to limit the scope of the exemplary embodiment the following examples illustrate preparation and use of the silane coupling agent.

Each of the references mentioned herein is incorporated by reference in its entirety.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A silane coupling agent, wherein the silane coupling agent has the general formula (I):

Formula (I)

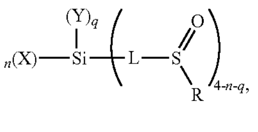

where X represents the hydrolyzable group, each X is independently selected from alkoxy, acyloxy, halogen or amine groups;

Y is selected from a non-hydrolyzable group, a repeat unit corresponding to the rest of Formula (I), and an organosilane group, L represents the linking group having at least three carbon atoms, R represents the leaving group, wherein at least one of which is methyl;

q is 0, 1, or 2, n is 1, 2, or 3, and n+q is less than 4.

2. The silane coupling agent of claim 1, wherein the silane coupling agent has the general formula (II):

Formula (II)

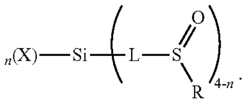

3. The silane coupling agent of claim 1, wherein the leaving group R has the general formula:

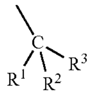

where $R^1$, $R^2$, and $R^3$ are each independently H or a hydrocarbyl group.

4. The silane coupling agent of claim 3, wherein at least one of $R^1$, $R^2$, and $R^3$ is an alkyl group.

5. The silane coupling agent of claim 4, wherein at least one of $R^1$, $R^2$, and $R^3$ is a methyl group.

6. The silane coupling agent of claim 1, wherein each hydrolysable group X is independently selected from an alkoxy group, an acyloxy group, a halogen group, and an amine group.

7. The silane coupling agent of claim 1, wherein the linking group L is a hydrocarbylene group.

8. The silane coupling agent of claim 7, wherein the linking group L is selected from the group consisting of $C_2$-$C_{24}$ alkyl groups, $C_2$-$C_{24}$ alkylene groups, $C_4$-$C_{24}$ cycloalkyl groups, $C_4$-$C_{24}$ heterocycloalkyl groups, $C_6$-$C_{24}$ aryl groups, and $C_6$-$C_{24}$ alkylaryl groups.

9. A method of forming a silane coupling agent comprising:

reacting a chlorinated silane compound with a hydrocarbyl thiol, optionally in the presence of a non-oxidizable silane:

wherein the chlorinated silane compound comprises a silicon atom directly linked to three hydrolysable groups selected from alkoxy, acyloxy, halogen or amine groups, and the silane coupling agent formed contains only one silicon atom and is free of polysulfidic linkages;

where X represents a hydrolyzable group;
L represents a hydrocarbylene linking group;
R represents a hydrocarbyl leaving group; and
n is 1, 2, or 3; and
oxidizing the sulfide group to form the silane coupling agent.

* * * * *